May 27, 1969   K. DYBAL ET AL   3,446,492
TUNNEL FURNACE FOR HARDENING OF BRIQUETTED COKE
Filed Jan. 31, 1967
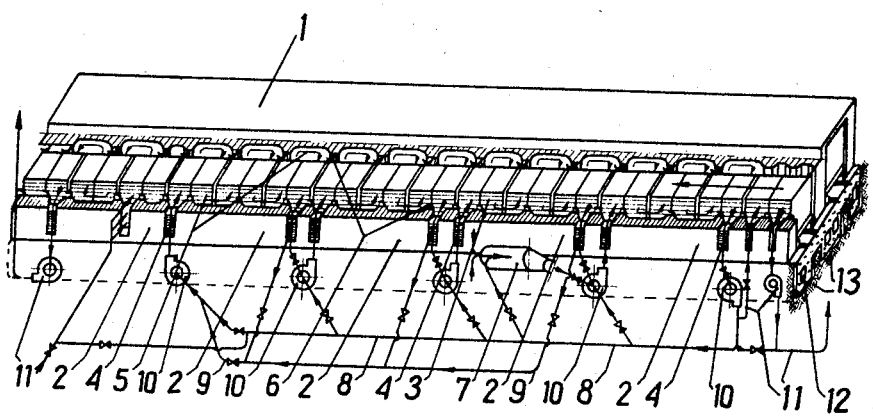
INVENTORS
KAZIMIERZ DYBAL, EUGENIUSZ STWORA,
KAZIMIERZ SUCHON
BY: Stevens, Davis, Miller & Mosher
ATTORNEYS

United States Patent Office 3,446,492
Patented May 27, 1969

3,446,492
TUNNEL FURNACE FOR HARDENING OF BRIQUETTED COKE
Kazimierz Dybal, Bytom, and Eugeniusz Stwora and Kazimierz Suchon, Gliwice, Poland, assignors to Biuro Projektow Przemyslu Hutniczego "Biprohut" Gliwice, Poland, a corporation of Poland
Filed Jan. 31, 1967, Ser. No. 612,887
Claims priority, application Poland, Jan. 31, 1966,
P 112,724
Int. Cl. F27b 9/14; F26b 19/00
U.S. Cl. 263—28
1 Claim

ABSTRACT OF THE DISCLOSURE

A tunnel furnace for hardening of briquetted coke having a chamber divided into several zones and one open side in the chamber. This opening is closed off by charging cars which hold the briquetted coke on shelves which are spaced to permit gas flow between them. A combustion chamber provides hot gas to vertical feeding nozzles which are also adapted to receive gases from a cold circulation collector beneath the chamber.

---

The invention relates to a continuous tunnel furnace for hardening of briquetted coke in a continuous process. The process of manufacturing the briquetted coke is being a technological novelty, therefore, no conventional designs of furnaces for such a furnace hardening exist up to now. Experimental units based upon the conveyance by means of bands show several faults and technological disadvantages and first of all their efficiency is rather low.

The tunnel furnace according to the invention shows several advantages causing that besides obtaining of good, homogeneous hardening of briquetted coke in an economical process, the specific yield is high and servicing of the arrangement is not complicated. Moreover, these furnaces may be erected as twin-tunnel furnaces, as their control and servicing elements are installed on only one longitudinal wall of the furnace.

The subject of the invention is shown by means of an exemplary embodiment and in accompanying drawing, where FIG. 1 shows the axonometric projection with a partial longitudinal section of a two-tunnel furnace.

The furnace consists of a hardening chamber, technologically divided into several zones 2 with shelved charging cars 3 therein. Vertical feeding nozzles 4, guide vanes 5 and pendulous self-pressing screens 6 are mounted on the longitudinal walls of the hardening tunnel 1. The combustion chamber 7 is connected with the vertical feeding nozzles 4, cold circulation collector 8 and hot circulation collector 9 by means of fans 10. The charging and discharging entrances to the chamber 1 are closed by the charging cars 3 and by means of fan cycles of gases 11 and air, with their outlets to the environment of the furnace. Conveyors 12 for the removal of coke scraps and dust are mounted along both walls of the chamber 1 under the vertical feeding nozzles 4 and guide vanes 5. The cars are sealed in the direction of their length by means of labyrinth seals 13, filled preferably with water.

The operation of the above described tunnel furnace runs as follows:
The charging cars 3 loaded with coke briquets are pushed one after another into the chamber 1.
The length of the chamber 1 is formed as a multiple of the length of charging car 3, thus the first and the last car form the closures of the chamber 1. The generated hot combustion gases from the combustion chamber 7 are sucked by the fan 10, mixed with cold circulation gases 8 and by means of the vertical feeding nozzles 4 is pressed between the shelves of the charging cars 3.

The gases flow through across the charging cars between their screens and are returned several times by means of guide vanes 5, and then sucked after several courses by the vertical nozzles 4 of the next fan 10.

Such a circulation of gases is assured by the fact that the intervals of the screens of charging cars 3 match with the distance between the vertical feeding nozzles 4, guide vanes 5 and the self-pressing, pendulous screens 6 on the longitudinal walls of the chamber 1. The distance between two subsequent fans 10 forms a single technological zone where the generated gases may flow through, complemented with gases coming from the cold circulation collector 8 and the hot circulation collector 9.

To prevent the infiltration of surrounding air through the slots in the closure formed by the charging cars into the chamber 1, a circulation gas closure is applied. This closure is effected by blowing in the gas by means of fans which exhaust the gas-and-air mixture outside the furnace.

The coke scraps and dust which may fall along the tunnel 1 from the charging cars 3 are removed from the tunnel by conveyors 12 installed below the vertical feeding nozzles 4 and guide vanes 5 along both walls of the tunnel 1.

What we claim is:
1. A tunnel furnace for hardening briquetted coke comprising:
  (a) an elongated chamber divided into a plurality of zones and open along one side;
  (b) charging cars having shelves adapted to be loaded with the charge, said shelves spaced to permit gas flow between them in a sinuous path;
  (c) fan means to move gas between said shelves;
  (d) vertical gas feeding nozzles connected to said fan means and mounted at spaced intervals along said chamber to induce a horizontal sinuous flow of gas between said cars;
  (e) a combustion chamber to supply hot gas;
  (f) a cold circulation collector connected to each of said zones;
  (g) means connecting said fan means, combustion chamber and cold circulation collector to permit selective circulation of gas from any of them;
  (h) means to close said open side comprising an imperforate surface on one end of each charging car, the total area of such surfaces being approximately equal to said opening and biased closure means along at least one edge of said opening to complete the closure of said opening in conjunction with said surfaces.

References Cited

UNITED STATES PATENTS

| | | | |
|---|---|---|---|
| 1,247,284 | 11/1917 | Kruger | 34—216 X |
| 1,322,652 | 11/1919 | Testrup | 263—28 |
| 2,805,848 | 9/1957 | Guigon et al. | 263—28 |
| 2,899,189 | 8/1959 | Matis et al. | 263—28 |

FOREIGN PATENTS 1,346,080   11/1963   France.

JOHN J. CAMBY, Primary Examiner.

U.S. Cl. X.R.
34—216